United States Patent Office 2,894,038
Patented July 7, 1959

2,894,038

PREPARATION OF BIFUNCTIONAL CYCLOALKANES

Jeffrey H. Bartlett, Westfield, and Vincent L. Hughes, Clark Township, Union County, N.J., assignors to Esso Research and Engineering Company, a corporation of Delaware No Drawing. Application February 24, 1956
Serial No. 567,441

3 Claims. (Cl. 260—598)

The present invention relates to the preparation of bifunctional cyclic compounds by the reaction of a monofunctional cycloalkene with hydrogen and carbon monoxide under carbonylation conditions in the presence of a novel catalyst therefor. More specifically, this invention relates to the carbonylation of a cyclic olefin containing a single functional group in the presence of a rhodium-containing catalyst to produce a cyclic alkane containing two functional groups.

It is now well known in the art that oxygenated organic compounds may be synthesized from organic compounds containing olefinic linkages by a reaction with carbon monoxide and hydrogen in the presence of a cobalt containing catalyst in an essentially three stage process. In the first stage of this so-called Oxo process, the olefinic material is reacted with carbon monoxide and hydrogen in the presence of the cobalt catalyst under conditions to produce a product consisting predominantly of aldehydes containing one more carbon atom than the reacted olefinic compound. This product mixture, which contains dissolved therein salts and the carbonyls as well as molecular complexes of the metal catalyst, is generally treated in the second stage to cause removal of soluble metal compounds from the organic material in a catalyst removal zone. The catalyst free material may then be hydrogenated to the corresponding alcohols or may be oxidized to corresponding acids.

It is known that bifunctional compounds are not readily prepared by the carbonylation or Oxo reaction using conventional cobalt salt as a catalyst. It has been recognized as evidenced by the British Patent 702,206, published January 13, 1954, that although it is possible to use in place of a simple olefin, an unsaturated organic compound containing a functional group as a reactant, the yield of aldehydes obtained therefrom varies considerably according to the chemical nature of the feed stock. It is known, for example, that the use of unsaturated compounds having in the molecule a formyl group as a feed stock for a conventional Oxo process gives poor yields of the primary product, that is, the dialdehyde formed by carbonylation at the double bond. If a formyl group is present in an olefinic compound, there appears to be a greater tendency to hydrogenate the olefinic double bond than to carbonylate it. When dialdehyde does form, secondary reactions in the reaction zone, particularly polymerization, condensation and reduction of the carbonyl, accompanies the reaction and little dialdehyde product can be recovered.

There have been previous attempts to overcome the difficulties in forming difunctional compounds, however, these attempts have either met with failure or they required several steps to obtain the dialdehyde product. For example, it has been suggested that cyclic acetals be first formed and then reacted under oxo conditions to produce dialdehyde derivatives in acceptable yields.

It has now been found that bifunctional cycloalkanes may be readily formed in high yields from cycloalkenes possessing a functional group such as a formyl, methylol, nitrile, carboxylic, aminomethyl and the like, by carrying out a carbonylation reaction in the presence of a rhodium-containing catalyst.

The conditions of reaction which may be employed are as follows: The difunctional compounds may be formed by a carbonylation reaction using temperatures in the range of 60 to 200° C., preferably from 90 to 150° C. Particularly in oxonating olefinic compounds containing a reactive functional group such as a carbonyl, it is desirable to use low temperatures in the range of 90 to 150°, since the higher temperatures generally result in undesirable side reactions including the aforementioned condensation, polymerization and reduction.

The pressures employed should range between 1000 to 10,000 p.s.i.g. and preferably between 2000 and 4000 p.s.i.g. The rhodium-containing catalyst is preferably used in the range of 0.01 to 0.5% by weight calculated as metallic rhodium based on the feed. However, up to 5.0% and more, can be used without any serious disadvantages. The upper limit is primarily a practical one and governed by economics. The olefin feed may be used as such but is preferably employed in an inert solvent diluent such as hexane, heptane, cyclohexane, benzene, etc. $C_6$–$C_{11}$ paraffins are particularly preferred since they are easily separated from the oxygenated phase. While other diluents such as ethers, other aldehydes and alcohols, may be used, it is desirable to employ a diluent which does not contain a reactive functional group. In general, it is preferred to use a diluent to feed ratio greater than 1.5/1 on a volume basis, but larger or smaller amounts may be used and a suitable range is .5 to 10/1. The carbon monoxide to hydrogen ratio will preferably be about 1/1, however, from 1/5 to 5/1 is operable.

In order for rhodium to catalyze the reaction effectively, it is essential that it be present in the form of a soluble product during the reaction. Elemental rhodium, inorganic or organic rhodium salts are examples of those substances which will form a soluble rhodium compound under the reaction conditions of the present process. The rhodium may be in the form of a carbonyl which would include any rhodium carbonyl, hydrocarbonyl mixtures and complex compounds thereof. Accordingly the catalyst of this invention may be added as metallic rhodium, a rhodium oxide, salt or any rhodium-containing composition of matter which can be maintained in the form of a soluble rhodium compound under said reaction conditions. More specifically rhodium dioxide, sesqui-oxide, halide, nitrate, sulfate, sulfite and salts of organic acids such as oleic, stearic, etc., may be employed. The preferred rhodium compounds for this process are the above noted oxides and the chloride.

Rhodium oxides and chlorides are especially desirable since they are easily converted to the soluble form and they represent the most effective form of rhodium from the standpoint of permitting fast reaction rates, good yields and low bottoms.

Rhodium carbonyls are usable and may be preformed in any known manner, to a form such as a solid crystalline material or in solution with an organic solvent, e.g., hexane, aldehyde, olefin, alcohol, etc., and either may be used in the reaction mixture as the catalyst. Rhodium carbonyl may be made by any of the various methods known in the art among which, direct union of carbon monoxide with metallic rhodium or a rhodium salt at high pressures, is effective. Rhodium carbonyl takes several forms, e.g. $Rh_2(CO)_8$, $(Rh(CO)_3)n$, $(Rh_4(CO_{11})n$ and $Rh(CO_4)_4H$. The various forms of rhodium carbonyl as well as mixtures thereof are suitable catalytic materials for the present reaction. However, some are more desirable than others.

Also, any of the above rhodium-containing catalysts may be supported on conventional carriers such as alumina, kieselguhr, silica, silica-alumina or any other carrier inert to the reaction. The proportion of rhodium or rhodium compound to the carrier is not critical since the catalytic effect is due solely to the amount of rhodium per unit of olefin feed. However, for practical considerations the rhodium compound when on a support should comprise from about 1% to 40% by weight based on rhodium to the carrier, with about 5% being preferred.

The amount of catalyst employed will depend mainly on the temperature and the desired results. Generally, higher operating temperatures require less catalyst; however, care must be taken not to raise the temperature above the point at which undesirable side reactions occur. Conversely, lower temperatures require more catalyst and result in a somewhat slower rate of reaction but higher yields of the bifunctional product. The side reactions can also be correlated with the residence time. With a shorter residence time, generally less side reactions will occur. Accordingly, it is desirable to maintain a balance between the amount of catalyst and the temperature in order to obtain a product of high purity.

If desired, small amounts of rhodium-containing catalyst may be combined with conventional catalyst such as cobalt oleate. When major amounts of conventional cobalt catalyst are used in conjunction with minor amounts of the rhodium catalyst of this invention, high reaction rates and essentially the same product distribution, as compared to rhodium catalysis per se, are obtained.

The ratio of cobalt catalyst to rhodium-containing catalyst may vary considerably; however, the preferred ratio is from about 100–1000 to 1. At low temperatures, e.g. $<120°$ C., cobalt in amounts of 0.3–2 mole percent may be used with about 0.001–0.05% rhodium whereas at higher temperatures, less cobalt and about 0.0005–0.003% rhodium are satisfactory to give fast reactions. Any of the aforementioned rhodium-containing catalysts may be used with any conventional cobalt-containing carbonylation catalyst.

It is to be understood that the present process is applicable to batch, semi-continuous or continuous type processes which are known. The present invention will be most valuable in a conventional continuous type carbonylation process.

In the present process, rhodium may be recovered in a direct single step operation, as a catalytically active product. The product recovered from the present process will contain dissolved rhodium therein. The rhodium may be recovered from the product by treatment with water at elevated temperatures whereupon the rhodium components precipitate out in the aqueous phase generally as a mixture of metallic rhodium and oxides thereof. Easy conversion of the precipitated rhodium to the active oxide may be accomplished by any well-known oxidation technique such as treatment with air at elevated temperatures, e.g., 400° C. Any rhodium remaining in the product in the form of a fine suspension after treatment with water may be recovered by flashing off the product. In the process of removing rhodium from the product or de-rhodiumizing, it is generally preferred to add from about 5 to 40% by volume water at 120°–200° C. Temperatures over about 200° C. are feasible but not desirable since high temperatures may cause condensation of aldehydes to give undesirable side products. Temperatures as low as 80° C. are also usable; however, to improve the rate of precipitation temperatures above 120° C. have been found to be advantageous. Water may be added in amounts up to one volume and more per volume of aldehyde product; however, large amounts are not desirable since excess water is difficult to handle.

The cyclic olefinic compounds contemplated herein as reactants may be characterized as cycloalkenes possessing a single functional group attached to a ring in a non-conjugated system, or non-conjugated mono-functional cycloalkenes. The cycloalkene may possess one or more lower alkyl substituents attached to the ring leaving at least one active hydrogen atom on the olefinic carbon atoms. It is to be understood that the functional group may be a carboxyl, ester, nitrile, alkylol, carboxy amido and the like. The present process, however, is extremely attractive in preparing a bifunctional compound wherein the single functional group attached to the cycloalkene is a formyl radical, since these compounds have not heretofore undergone the oxo synthesis with any degree of success.

The mono-functional compounds which are to be used as reactants in the present process may be conventionally prepared by the well-known Diels-Alder process such as described in "Organic Chemistry" by Gillman, volume I, second edition, published by John Wiley & Sons, on page 685. Generally, to prepare the mono-functional cycloalkenes which are suitable as reactants for this invention, it is desirable to treat conjugated diolefins with acrylic compounds. An adduct of the Diels-Alder type results which is a cycloalkene possessing the functional group of the acrylic compound. Some of the conjugated diolefins which may be used are butadiene, isoprene, piperylene, dimethylbutadiene, and conjugated diolefins resulting from steam cracking of petroleum and having a molecular weight from 54 to about 1000. Also, diolefins of the type of vinylacetylene may be used. These diolefins readily form adducts with such acrylic compounds as acrolein, methacrolein, acrylonitrile, methacrylonitrile, methylacrylate, methyl methacrylate and their homologs, etc. Such adducts having a cycloalkene basic structure are readily oxonated to the bifunctional compounds in the presence of the rhodium-containing catalyst of this process. Generically, the compounds may be represented by the following formula:

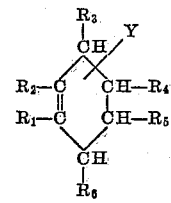

wherein Y represents a functional group such as formyl, carboxyl, ester, nitrile, alkylol and the like. $R_1$–$R_6$ represent hydrogen or lower alkyl radicals. At least one of the double bond carbon atoms must have attached thereto, an active hydrogen atom in order for carbonylation to proceed. Accordingly, $R_1$ or $R_2$ must be a hydrogen atom. Y may be attached anywhere on the ring which will form a non-conjugated system, for example, if Y represents

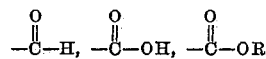

etc., it may only be attached to positions $R_3$ to $R_6$, but not at $R_1$ or $R_2$. In all of the formulae shown, the ring structures are saturated unless otherwise indicated.

The following compounds represent a few of the preferred olefinic reactants which come within the scope of the present invention:

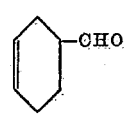
4-formyl cyclohexene

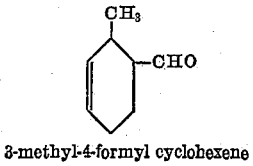
3-methyl-4-formyl cyclohexene

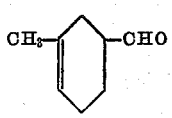 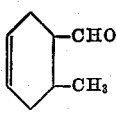

2-methyl-4-formyl cyclohexene    4-methyl-5-formyl cyclohexene 3,5 dimethyl-4-formyl cyclohexene; 3,6 dimethyl-4-formyl cyclohexene; 2,3-diethyl-6-methyl-4-formyl cyclohexene; 3-propyl-5-formyl cyclohexene; 3-formyl cyclohexene; 1-methyl-3-formyl cyclohexene; 4-carboxy cyclohexene; 3-methyl-4-carboxy cyclohexane and 3,6-dimethyl-4-carboxy cyclohexene; 2-methyl-4-cyano cyclohexene; 3-methyl-4-carboxyamido cyclohexene.

Rather than extending the list of reactants usable, it is to be understood that similar compounds having various other functional groups are contemplated by the present invention.

The following examples serve to illustrate the direct formation of bifunctional cyclic alkanes from monofunctional cyclic alkenes.

EXAMPLE 1

700 ccs. of tetrahydrobenzaldehyde, 1200 ccs. of hexane and 0.4 gram of rhodium sesquioxide were added to a 3 liter reactor. Carbon monoxide and hydrogen (1:1) were pressured in to the extent of 500 p.s.i.g. The temperature was then raised to 100° C. and additional carbon monoxide and hydrogen added to 3500 p.s.i.g. Reaction occurred almost immediately as evidenced by the pressure drop, and the reactor was repressured and then shut off when gas up-take slowed down. After cooling, the product was removed and two phases were allowed to separate, the oxygenated phase representing the bottom layer. The upper layer was stripped by flash distillation to remove the hydrocarbon solvent and the remaining product was combined with the lower oxygenated phase and the mixture distilled.

Distillation at about 1 millimeter pressure gave 4 fractions, analyzing as follows:

Fraction 1 constituting 23% of the product had a boiling range of 82°–89° C. at 1 mm. pressure, a carbonyl number of 1.311 ceq./gram (theoretical for delta 3-tetrahydrobenzaldehyde=0.96; for cyclohexanedial-1, (3 or 4)=1.429) an iodine number of 0.009 ceq./gram and a hydroxyl number of 0.046 ceq./gram.

Fraction 2 which constituted 41% of the product and boiled from 89° to 90° C. at 1 mm. pressure, had a carbonyl number of 1.353, hydroxyl number of 0.107 indicating 87% dialdehyde and 13% hydroxy aldehyde.

Fraction 3 constituting 19% of the product, had a carbonyl number of 1.263, hydroxyl number of 0.147 and no iodine value. This product boiled from 90°–94° C. at 1 mm. and was analyzed as 79% dialdehyde and 21% hydroxy aldehyde.

Fraction 4 boiling from 95° to 120° C. at 1 mm. was 4% of the product and analyzed as 60% dialdehyde and 40% hydroxy aldehyde. The remaining bottoms product amounted to 13%.

*Product distribution*

| | Percent |
|---|---|
| Unreacted hydrogenated feed | 2 |
| Dialdehyde | 71 |
| Hydroxy aldehyde | 14 |
| Bottoms | 13 |

EXAMPLE 2

700 grams tetrahydrobenzaldehyde, 1200 ccs. of hexane and 0.32 gram $Rh_2O_3$ were added to a 3 liter stainless steel reactor and 100 p.s.i. of CO were added. The temperature was raised to 150° C. to solubilize the rhodium oxide, and then it was lowered to 100° C. CO was added to 1700 p.s.i.g. and $H_2$ was added to a total pressure of 3500. After a short induction period, the reaction proceeded whereupon the pressure dropped to 900 p.s.i. in some 10 minutes. On repressuring to about 3500 p.s.i., additional 1800 p.s.i. $CO/H_2$ was taken over a period of 2 hours and the reaction slowed down. The reactor was cooled, vented and the product analyzed as previously. A second cut corresponding to the second cut of the previous example analyzed as 90% dialdehyde.

The value of the present process wherein bifunctional compounds are produced in a simple straight forward manner in good yields can be appreciated by reference to the following equations wherein a great variety of valuable bifunctional compounds and obvious derivatives thereof are shown to be obtainable as typified by the following equations:

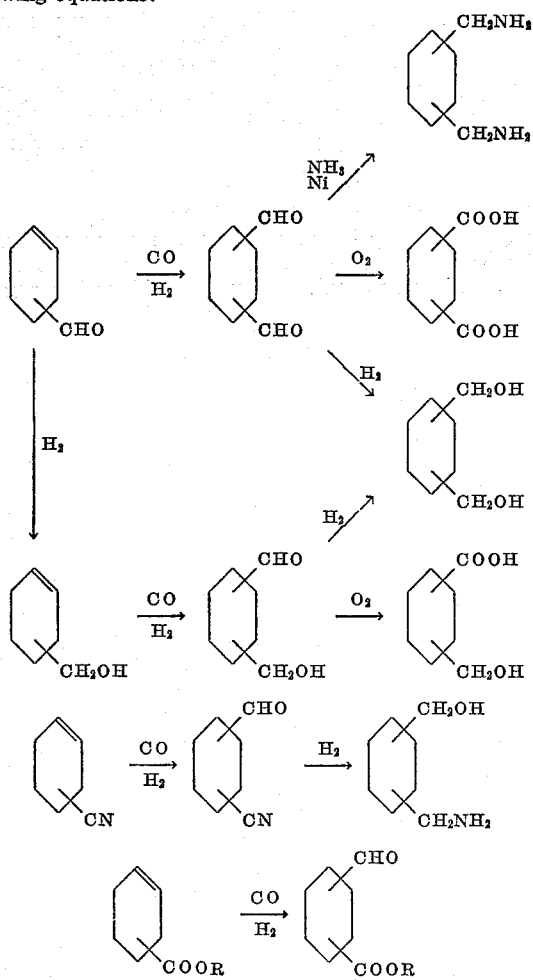

The above compounds are saturated unless otherwise indicated.

It will be noted from the above equations that the exact position of the entering carbonyl group is not indicated. The carbonyl group probably goes predominantly in the para position with respect to the other functional group. However, in order to direct the carbonylation to the para position, the use of cyclic alkenes derived from suitable conjugated diolefins such as isoprene instead of butadiene in conjunction with acrylic compounds is contemplated.

For example, a Diels-Alder type reaction of acrolein and piperylene produces the following cyclic aldehydes:

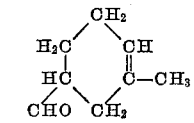

2-methyl-4-formyl cyclohexene

Thus the only active hydrogen on an olefinic carbon atom is in a para position with respect to the aldehyde or other functional group.

Carbonylating 2-methyl-4-formyl cyclohexene with rhodium catalysis proceeds as follows:

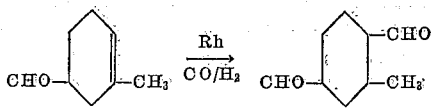

The utility of most of the compounds expressed above are wide and varied, some of them being indicated below:

(1) Simple esters of the dimethylol derivatives and dicarboxylic acids are valuable as plasticizers and synthetic lubricants.

(2) Complex esters derived from the dimethylol compound and dicarboxylic acids with mono-carboxylic acids may be used as permanent type plasticizers.

(3) The aldehydes, methylol compounds, carboxylic acids and esters may be used in formulating medicinals, agricultural chemicals, synthetic rubber and as plasticizers for various compositions.

What is claimed is:

1. A method of preparing a bifunctional cyclic compound which comprises reacting a cycloalkene possessing a formyl group attached to the ring by a carbon to carbon bond in a non-conjugated system with carbon monoxide and hydrogen at elevated pressures and temperatures within the range of 60 to 200° C. in the presence of a catalytic amount of a composition containing from 0.3 to 2 mole percent of cobalt containing catalyst and from 0.0005 to 0.05 mole percent rhodium containing catalyst to produce a cycloalkane compound possessing two formyl groups attached to the ring.

2. A process in accordance with claim 1 wherein the ratio of cobalt catalyst to rhodium catalyst is between 100 and 1000/1.

3. A process in accordance with claim 1 wherein said temperatures are maintained at less than 120° C., the cobalt catalyst in an amount from 0.3 to 2 mole percent and rhodium containing catalyst in an amount of 0.001 to 0.05 mole percent.

References Cited in the file of this patent
UNITED STATES PATENTS

| | | |
|---|---|---|
| 2,327,066 | Roelen | Aug. 17, 1943 |
| 2,548,159 | Houtman et al. | Apr. 10, 1951 |
| 2,749,328 | Cline | June 5, 1956 |

FOREIGN PATENTS

| | | |
|---|---|---|
| 702,206 | Great Britain | Jan. 13, 1954 |